March 8, 1949.  J. M. SPINKS  2,464,188

PHOTOFLASH CIRCUITS

Filed Sept. 27, 1946

INVENTOR
J. M. SPINKS
By: Fetherstonhaugh & Co.
ATT'YS

Patented Mar. 8, 1949

2,464,188

UNITED STATES PATENT OFFICE 2,464,188

PHOTOFLASH CIRCUITS

James Merritt Spinks, Buffalo, N. Y., assignor, by mesne assignments, to Dormitzer Electric & Manufacturing Corporation, Brookline, Mass., a corporation of Massachusetts Application September 27, 1946, Serial No. 699,705

8 Claims. (Cl. 315—238)

This invention relates to a photoflash circuit and in particular a photoflash circuit having a power pack to which lamp units are detachably connected. In prior units of this class lamp units having gaseous discharge tubes are connected across discharge condensers located in the power pack by means of long pulse cables. These discharge condensers are customarily charged to between 1000 and 5000 volts and hold about .05 coulomb. In the units of the prior art this voltage appears across the leads connecting the power pack to the lamp units from the time the discharge condensers are charged until they are discharged through the photo tubes. In many instances the amateur photographer and often the professional photographer using these units is not aware of the fact that these high voltages are present and is subjected to a risk of severe electrical shock without the knowledge that the risk exists.

Photoflash units of the prior art are insulated to conform to standards set down by various hydro codes and regulations. These precautions, however, do not remove the risk of harm to the operator and those handling the units as evidenced by the fact that operators often do receive severe electrical shocks, especially when the insulation becomes worn or out of repair.

The present invention eliminates all risk of electrical shock to the operator from the leads extending from the power pack to the light units between the time of charging the discharge condensers and discharging them through the flash tubes. It further provides a more simple and more economical unit by reducing the number of conductors connecting the lamp units to the power pack from three to two.

It is therefore an object of this invention to provide a photoflash circuit in which there will not be any voltage across lead wires connecting the power pack to the lamp units between the times of charging the discharge condensers and firing the unit.

It is an object of this invention to provide a lamp unit which is capable of producing a wide variation of photoflash effects.

It is a still further object of this invention to provide a photoflash unit from which it is impossible to receive a serious electric shock while operating it.

With these and other objects in view the invention generally comprises a photoflash unit having a power pack and a plurality of detachably connected lamp units. The power pack houses discharge condensers which are designed to discharge through photo tubes in the lamp units upon the closing of a relay to cause a photoflash. The novel feature of the circuit of this invention is the inclusion of a means in connection with the flash tubes for raising the potential of their trigger electrodes to cause the discharge condenser to discharge through them almost immediately upon the application of the voltage of the discharge condenser to them. This firing means preferably includes a firing condenser connectable to the discharge condenser simultaneously with the tube and a break down tube and transformer series connected across said firing condenser. The control electrode of the flash tube is connected across the secondary of the transformer. The operation of the unit is briefly this: A voltage is impressed across the flash tube and firing means; the firing condenser begins to charge; when the voltage on the charging condenser reaches a predetermined amount the discharge tube breaks down; the firing condenser then discharges through the discharge tube and transformer to induce a high voltage across the trigger electrode of the tube. This high voltage starts conduction between the main electrodes of the tube. The invention will be clearly understood by reference to the following detailed description taken in conjunction with the accompanying drawings.

Figure 1:
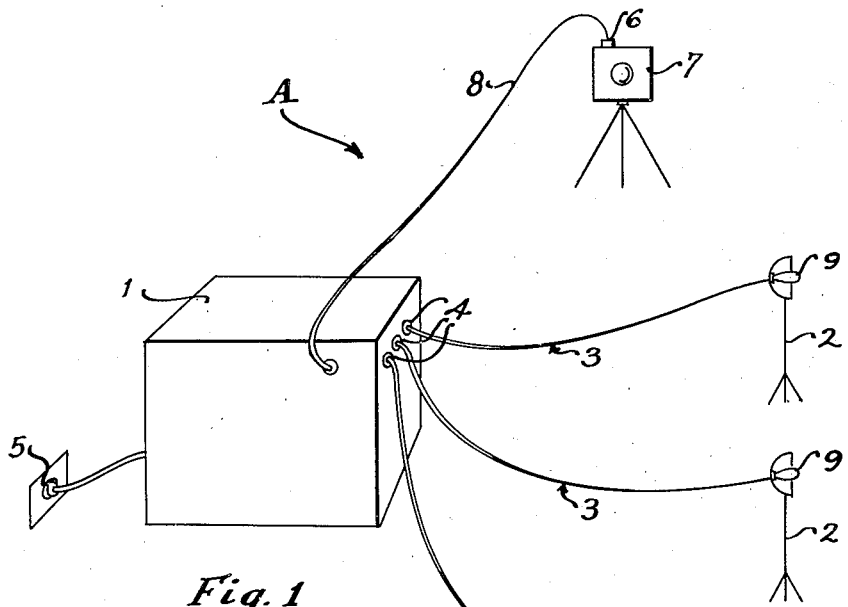
Fig. 1 shows a perspective view of a photoflash unit according to the present invention.
Figure 2:
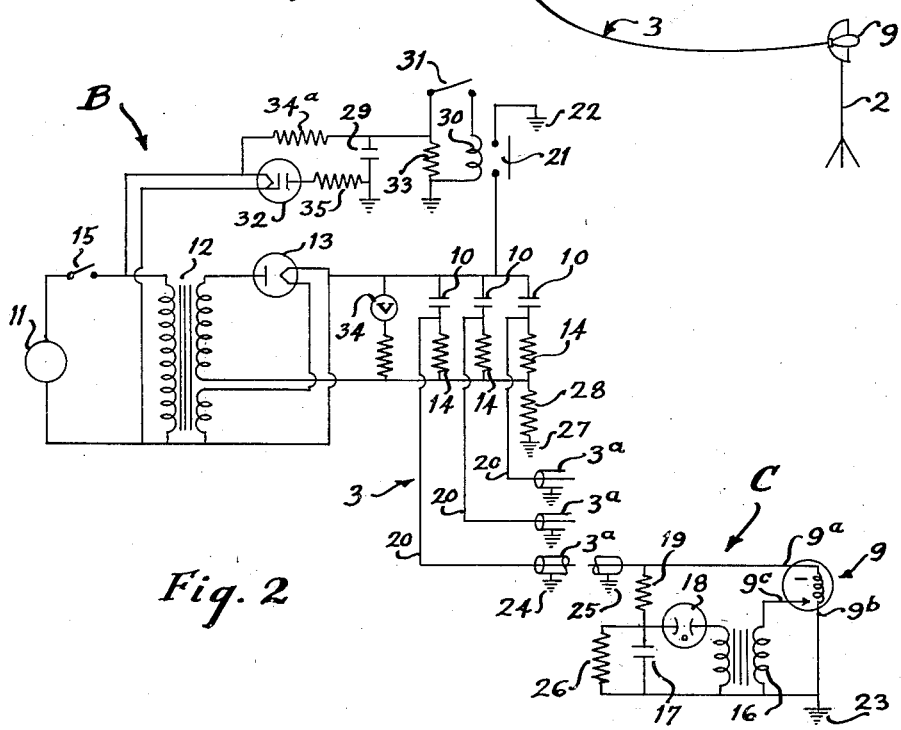
Fig. 2 shows a wiring diagram of the circuit of the present invention.

Referring to the drawings A indicates a photoflash unit in general. It comprises a power pack unit 1 and a plurality lamp unit 2 detachably connectable thereto by means of cables 3 as at 4. The power pack 2 houses a plurality of discharge condensers which condensers are charged from a power supply such as a hydro 110 v. outlet 5. A switch 6, preferably mounted on the camera 7 and electrically connected to the power pack by the cable 8 is designed to operate a relay within the power pack to discharge the discharge condensers through photo tubes 9 of the lamp units 2 in synchronism with the opening of the camera shutter.

In the wiring diagram the letter B generally indicates the power pack and the letter C indicates the lamp units. They are detachably connected by the cable 3 as indicated above.

The power pack B houses a plurality of discharge condensers 10. These condensers can be charged to any predetermined amount from a voltage supply 11 through the transformer 12, rectifier 13 and charging resistors 14 upon the closure of the switch 15. A meter 34 is connected as shown to indicate the voltage or amount of charge on the condensers 10.

Each lamp unit C has a flash tube 9. These flash tubes are of the conventional type used in flash photography each having two main electrodes 9a, 9b and a tickler or control electrode 9c. They are designed such that when a sufficient voltage is impressed across the main electrodes 9a and 9b and the control electrod 9c is raised to a predetermined potential the tube will fire or conduct electricity between the main electrodes. In this embodiment of the invention the control electrode 9c is connected to one side of the secondary of the transformer 16. The primary winding of the transformer 16 is connected in series with the gaseous discharge tube 18 across the firing condenser 17. Numeral 19 indicates a charging resistor designed to control the charging time of the firing condenser 17.

The operation of the lamp unit is this. A voltage, sufficient to break down the tube 9 when the control electrode 9c is raised to a sufficient potential, is impressed across the main electrodes 9a, 9b and the series connected resistor 19 and firing condenser 17. The firing condenser 17 begins to charge. As soon as the voltage on condenser 17 reaches a predetermined amount the discharge tube 18 breaks down causing the condenser to discharge through the tube 18 and the primary of transformer 16. This surge of current through the transformer induces a high voltage acoss the secondary of the transformer and raises the potential of control electrode 9c high enough to start conduction through the gas tube 9. Voltages of between 1000 to 5000 volts are ordinarily impressed across the main electrodes of tube 9 and the gaseous discharge tube 18 is designed to break down when the voltage across the condenser 17 reaches about 500 volts. By design of the circuit elements 17, 19, 18, 16 and 9 the time required for the above operation to take place can be varied. It was found that very satisfactory operation of the tube 9 can be effected within $\frac{1}{1000}$ of a second from applying the voltage to the tube.

The tube 18 is designed to have a low breakdown voltage, and to carry a large surge current as the condenser 17 discharges. In this respect the condenser 17 must be designed to hold a large enough charge at the breakdown voltage of the tube 18 to supply a sufficiently high rate of change of current through the transformer 16 on discharge to raise the potential of the control electrode 9c to a potential high enough to cause the tube 9 to fire.

In the preferred embodiment of this invention the lamp units are connected to the discharge condensers of the power pack in the following manner. One side of each condenser 10 is connected to a charging resistor 19 and an electrode 9a of one lamp unit by lead 20. The opposite plate of each of the discharge condensers 10 are all connected to one side of a relay 21. The opposite side of the relay 21 is grounded to the frame of the power pack as shown at 22 so that when the relay 21 is closed the latter mentioned sides of all discharge condensers are grounded to the frame of the power pack. One side of condenser 17, transformer 16 and flash tube 9 is grounded to the frame of the lamp unit as indicated at 23. The cable 3 connecting the lamp units to the power pack is preferably shielded cable so that by grounding the shield 3a to the frame of the power pack and to the frame of the lamp unit as indicated at 24 and 25 respectively all grounds in the system are common.

It will be apparent from the description this far that when the condensers 10 are charged and the relay 21 is open that the voltage of the condensers will not appear across any points of the lamp units or the cables connecting the lamp units to the power pack and that it would be impossible to receive an electrical shock from these parts. As soon as the relay 21 is closed each discharge condenser is connected across the lamp unit through the lead 20 and through the ground connections described above. The condenser 17 immediately begins to charge through resistor 19. When its voltage reaches a predetermined amount discharge tube 18 breaks down and the current pulse resulting from the discharge of condenser 17 through transformer 16 raises the potential of trigger electrode 9c high enough that each of the condensers 10 can discharge through a separate one of the gas tubes 9 and emit a photoflash.

In experimentation with this invention it was found that when a number of lamp units were connected to the power pack one lamp would occasionally fire before the others. This condition was caused by the condensers 17 of one of the lamp units being partially charged before the relay 21 was closed so that this specific condenser reached the breakdown voltage of the tube 18 before the condensers of the other lamp units and caused its tube to fire before the others. The difficulty was overcome by placing leakage resistors 26 across the condenser 17 so that all residual charge on condensers 17 can leak off before the relay 21 is closed.

The resistors 14 serve to isolate the discharge condensers 10 during discharge as well as to control the charging time of the condensers. Thus, if one lamp unit fired a microsecond or so before the others and the discharge condensers were not so separated, the first tube to fire would tend to take power from all of the condensers and would emit a more brilliant flash than the others. The resistors 14 by their impedance prevent this condition from having this effect in such an instance and insure a flash of equal brilliancy from each tube.

Each of the resistors 14 are grounded as at 27 preferably through a resistor 28 so that if the unit is used with fewer lamp units than the maximum it is designed for, the condensers 10 to which no lamp units are attached can discharge through ground.

The relay 21 is operable to a closed position when the power stored on condenser 29 is discharged through the relay pull coil 30. The condenser 29 is so caused to discharge upon the closure of the switch 31. Switch 31 is preferably mounted on the camera and is designed to operate the shutter of the camera as well as the photoflash unit so that the photoflash from the flash tubes will occur at the same time as the opening of the camera shutter.

The condenser 29 is charged from the supply line 11 through the rectifier 32 and resistors 34a and 35.

Resistors 34a and 35 are safety resistors designed to limit the current through an operator's body in the event that he should go across any of the wires in the relay circuit.

From the foregoing it will be apparent that I have provided a photoflash circuit which is entirely safe to use. The discharge condensers are the only parts that carry a dangerous voltage and they are housed and insulated in an innermost part of the power pack box. No connection to the lamp unit is live or can become live until the relay 21 is closed.

The unit can further be used to obtain a wide variation of photo effects. The number of lamps used can be varied at will, the power per lamp can be varied at will, and the lamps fire in perfect synchronism with an even brilliancy, giving the photographer a complete control of illumination.

The unit is also cheaper to manufacture than the conventional photoflash unit. It only requires two connections between the power pack and the lamp units (cable 29 and the shield) as compared with three or four connections of the prior art and it employs a relatively simple relay to discharge the discharge condensers.

It will also be apparent that changes and modifications can be made in the disclosed circuit without departing from the spirit of the invention, for example, an impedance other than a transformer might be used to raise the potential of a control electrode. It is therefore intended that the above disclosure should not be taken in the limiting sense except for the limitations expressed in the following claims.

What I claim as my invention is:

1. An electrical system for operating a gaseous-discharge flash tube having two main electrodes and a control electrode comprising, a discharge condenser, a source of direct power for charging said condenser connected in parallel therewith, a normally open switching element for connecting said condenser in series with the main electrodes of said tube, and a firing circuit including a firing condenser, an impedance connecting said firing condenser in parallel with said main electrodes and a glow tube coupling said control electrode with the junction of said impedance and said firing condenser whereby the closing of the switching element impresses the discharge condenser voltage upon the main electrodes and simultaneously charges the firing condenser until the voltage across the firing condenser is impressed upon the control electrode by the breakdown of the glow tube thereby discharging the discharge condenser through the flash tube.

2. An electrical system for operating a plurality of gaseous-discharge flash tubes each having two main electrodes and a control electrode comprising, a plurality of discharge condensers, a source of direct power for charging said condensers connected in parallel therewith, a normally open switching element for connecting said condensers with the main electrodes of the respective tubes, and a firing circuit for each of said tubes including a firing condenser, an impedance connecting said firing condenser in parallel with the main electrodes of the respective tube, and a glow tube coupling said control electrode with the junction of said impedance and said firing condenser whereby the closing of the switching element impresses the discharge condenser voltages upon the main electrodes of the respective discharge tubes and simultaneously charges the respective firing condensers until the voltage across each of the firing condensers is impressed upon the respective control electrodes by the breakdown of the associated glow tube thereby causing the flash tubes to conduct and discharge their respective discharge condensers.

3. An electrical system for operating a plurality of gaseous-discharge flash tubes each having two main electrodes and a control electrode comprising, a direct power source, a plurality of discharge condensers, an isolating impedance connecting each respective condenser in parallel with said source, a normally open switching element for connecting said condensers in parallel with the main electrodes of the respective tubes, and a firing circuit for each of said tubes including a firing condenser, an impedance connecting said firing condenser in parallel with the main electrodes of the respective tube, and a glow tube coupling said control electrode with the junction of said impedance and said firing condenser whereby the closing of the switching element impresses the discharge condenser voltages upon the main electrodes of the respective discharge tubes and simultaneously charges the respective firing condensers until the voltage across each of the firing condensers is impressed upon the respective control electrodes by the breakdown of the associated glow tube thereby causing the flash tubes to conduct and discharge their respective discharge condensers.

4. An electrical system for operating a plurality of gaseous-discharge flash tubes each having two main electrodes and a control electrode comprising, a direct power source, a plurality of discharge condensers charged by said source, a normally open switching element connecting at least one of said condensers in series with the main electrodes of a respective tube, a discharge impedance connected in parallel with said condensers by said switching element, and a firing circuit for each of said tubes including a firing condenser, an impedance connecting said firing condenser in parallel with the main electrodes of the respective tube, and a glow tube coupling said control electrode with the junction of said impedance and said firing condenser whereby the closing of the switching element impresses the discharge condenser voltages upon the main electrodes of the respective discharge tubes and simultaneously charges the respective firing condensers until the voltage across each of the firing condensers is impressed upon the respective control electrodes by the breakdown of the associated glow tube thereby causing the flash tubes to conduct and discharge their respective discharge condensers, the condensers without flash tubes connected therewith being discharged through the discharge impedance.

5. An electrical system for operating a plurality of gaseous-discharge flash tubes each having an anode, a cathode and a control electrode comprising, a plurality of discharge condensers a source of direct power for charging said condensers connected in parallel therewith, a normally open switching element for connecting said condensers with the anode and cathode of the respective tubes, and a firing circuit for each of said tubes including a firing condenser, an impedance connecting said firing condenser across said anode and cathode, a transformer having a secondary connected between said anode and said control electrode and a primary, and a glow tube connecting said primary in parallel with said firing condenser whereby the closing of the switching element impresses the discharge condenser voltages upon the anode and cathode of the respective discharge tubes and simultaneously charges the respective firing condensers until the voltage across each of the firing condensers is impressed upon the respective control electrodes by the breakdown of the associated glow tube thereby causing the flash tubes to conduct and discharge their respective discharge condensers.

6. An electrical system for operating a plurality of gaseous-discharge flash tubes each having two main electrodes and a control electrode comprising, a plurality of discharge condensers, a source of direct power for charging said condensers connected in parallel therewith, a relay having normally open contacts for connecting said condensers with the main electrodes of the respective tubes and a solenoid, and operating condenser connected across and charged from said source, a switch for connecting said solenoid with said operating condenser, and a firing circuit for each of said tubes including a firing condenser, an impedance connecting said firing condenser in parallel with the main electrodes of the respective tube, and a glow tube coupling said control electrode with the junction of said impedance and said firing condenser whereby the closing of said relay contacts upon the discharge of the operating condenser impresses the discharge condenser voltages upon the main electrodes of the respective discharge tubes and simultaneously charges the respective firing condensers until the voltage across each of the firing condensers is impressed upon the respective control electrodes by the breakdowns of the associated glow tube thereby causing the flash tube to conduct and discharge their respective discharge condensers.

7. An electrical system for operating a plurality of gaseous-discharge flash tubes each having an anode, a cathode and a control electrode comprising, a plurality of discharge condensers, a source of direct power for charging said condensers, connected in parallel therewith, a normally open switching element for connecting said condensers with the anode and cathode of the respective tubes, and a firing circuit for each of said tubes including a firing condenser, an impedance connecting said firing condenser between said anode and cathode, a transformer having a secondary connected between said anode and said control electrode and a primary, a glow tube connecting said primary in parallel with said firing condenser, and a leakage impedance also connected in parallel with said firing condenser whereby the closing of the switching element impresses a discharge condenser voltage upon the anode and cathode of the respective discharge tubes and simultaneously charges the respective firing condensers until the voltage across each of the firing condensers is impressed upon the respective control electrodes by the breakdown of the associated glow tube thereby causing the flash tubes to conduct and discharge their respective discharge condensers.

8. An electrical system for operating a plurality of gaseous-discharge flash tubes each having an anode, a cathode and a control electrode comprising a direct power source, a plurality of discharge condensers, an isolating resistor connecting each respective condenser in parallel with said source, a relay having normally open contacts for connecting at least one of said condensers with the anode and cathode of a respective tube and a solenoid, an operating condenser connected across and charged from said source, a switch for connecting said solenoid with said operating condenser, a discharge resistor connected in parallel with said condensers by said relay contacts, and a firing circuit for each of said tubes including a firing condenser, a resistor connecting said firing condenser across said anode and cathode, a transformer having a secondary connected between said anode and said control electrode and a primary, a glow tube connecting said primary in parallel with said said firing condenser, and a leakage resistor also connected in parallel with said firing potential whereby the closing of the relay contacts impresses the discharge condenser voltages upon the anode and cathode of the respective tubes and simultaneously charges the respective firing condensers until the voltage across each of the firing condensers is impressed upon the respective control electrodes by the breakdown of the associated glow tube thereby causing the flash tube to conduct and discharge their respective discharge condensers.

JAMES MERRITT SPINKS.

REFERENCES CITED

The following references are of record in the file of this patent:

UNITED STATES PATENTS

| Number | Name | Date |
| --- | --- | --- |
| Re. 22,611 | Edgerton | Mar. 6, 1945 |